PATENTED MAY 25 1971 3,581,110

INVENTOR.
RICHARD J. BELCASTRO

BY Bernard E. Franz

ATTY.

INVENTOR
E. R. KRETZMER
BY
ATTORNEY

ADAPTIVE INTEGRATOR FOR DIGITAL SIGNALS

FIELD OF THE INVENTION

This invention relates to an integrator circuit and particularly to an integrator circuit which adaptively adjusts internal parameters to eliminate integration of erroneous signal components.

BACKGROUND OF THE INVENTION

Many electronic systems employ circuits which integrate analog voltage signals. In the most commonly used type of analog integrator, the voltage signal to be integrated is converted to a current signal and applied to a capacitor. The voltage developed across the capacitor is proportional to the integral of the applied current signal. To utilize the integral voltage waveform, a circuit element, typically an amplifier, senses the voltage across the capacitor.

Integrators of this type are sensitive to DC error components in the current applied to the capacitor and also to the current component required to drive the sensing amplifier. Both of these current components are integrated by the capacitor causing errors in the integrated output signal which may eventually drive the integrator out of its linear operating range. As a result, most integrators employed are periodically reset to an initial condition. The longer an integrator is run without resetting, the more expensive it becomes if it is required to maintain a fixed minimum output error.

Some electronic systems require circuits to integrate time varying voltage signals which have certain predetermined characteristics. An example of a time varying voltage signal having a predetermined characteristic is a digital data signal. In a digital data signal predetermined levels represent by encoded information.

In some instances, special purpose integrators have been developed to take advantage of the predetermined characteristic of the analog voltage signal. An example of a system in which special purpose integrators are used is a dipulse data transmission system. Dipulse transmission is employed to transmit information in digital forms without transmitting a DC level.

A dipulse signal is generated by delaying, which may have a plurality of predetermined information bearing levels, substrating the delayed data signal from the original data signal. The process of delaying and subtracting is called previous value subtraction. At a receiver, the original data signal is recovered by a process called previous value addition. The received signal is applied to one input of an adder circuit. The output of the adder circuit is delayed one data interval and fed back to provide a second input to the adder circuit. The delayed signal is then the sum of the values of all the previous information levels in the data signal. Similarly, there are other useful differential signal formats, notably one like the dipulse format which involves a delay of two data intervals instead of one.

A voltage step transformed into dipulse format is a single pulse occurring during the time of the first interval after the voltage transition. For the time after this first interval the dipulse signal is zero since the present and previous values for the data signal are equal. It is apparent then that the dipulse signal resembles a differentiation of the data signal. The previous value subtraction circuit, therefore, behaves like a differentiator. In a like manner, the previous value addition circuit, employed at the receiver to recover the data signal, behaves in many ways like an integrator.

One characteristic of an integrator exhibited by the previous value adder is the integration of error signals. DC offsets added to a dipulse signal during the transmission and applied therewith to the previous value adder are accumulated until the circuit is driven out of its linear operating range. Another source of integrated error arises when the signal gain from the first input of the adder circuit through the delay circuit and back to the second input of the adder circuit is other than unity. If the gain is greater than unity, the signal at the output of the delay circuit continuously increases, while if the gain is less than unity, the output signal continuously decreases.

In the past, the problem of error integration or accumulation in the previous value adder circuit was handled in a way analogous to other integrator circuits. The previous value adder circuit was periodically reset to an initial condition.

BRIEF DESCRIPTION OF THE INVENTION

In the present invention, a circuit for integrating an applied signal to provide an integrated signal having predetermined information indicative levels occurring during successive data intervals is controlled in response to the deviation of the integrated signal from the predetermined levels.

In one embodiment, a DC error polarity control signal is generated when the integrated signal in a plurality of succeeding data intervals deviates on the average from the nearest of the predetermined levels in the same polarity sense. The DC error polarity control signal varies a DC signal applied to the integrator circuit.

In a second embodiment, an amplitude error control signal is generated when the integrated signal in a plurality of succeeding data intervals deviates on the average from the nearest of the predetermined levels in the same polarity sense for at least one of said predetermined levels and in the opposite polarity sense on the average for at least another of said predetermined levels. The amplitude error control signal controls the gain of the integrator circuit.

DETAILED DESCRIPTION

Figure 1:
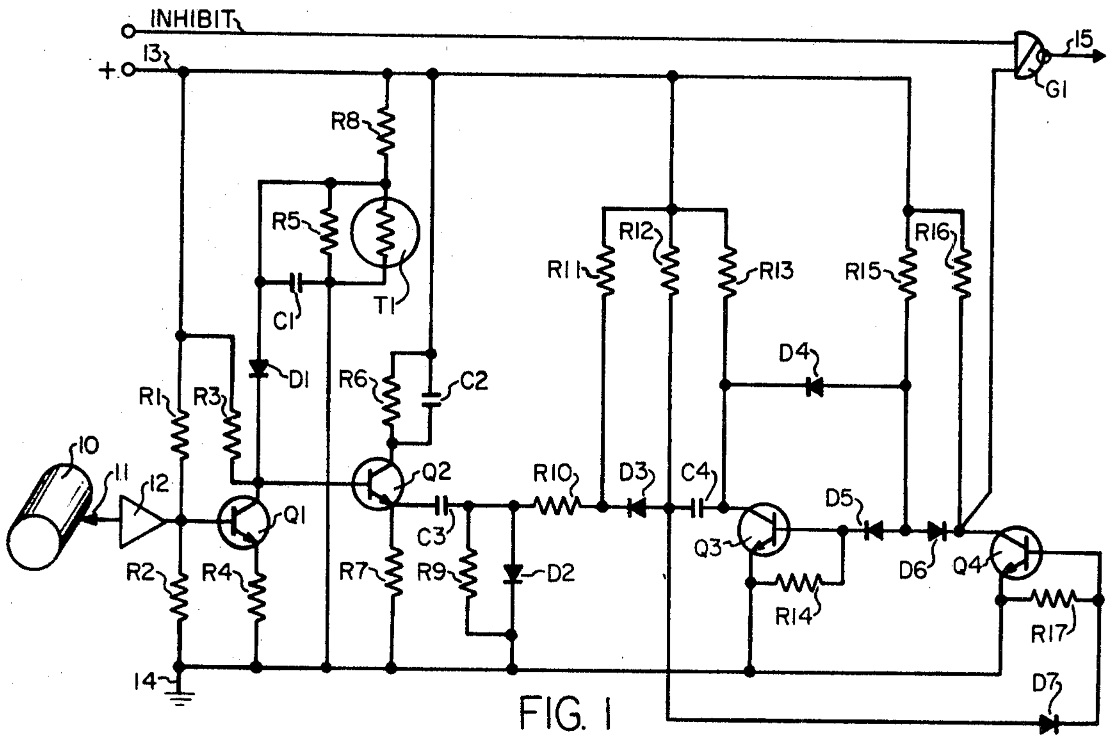
FIG. 1 is a block diagram showing a previous value adder type of integrator incorporating the principles of the invention.
Figure 2:
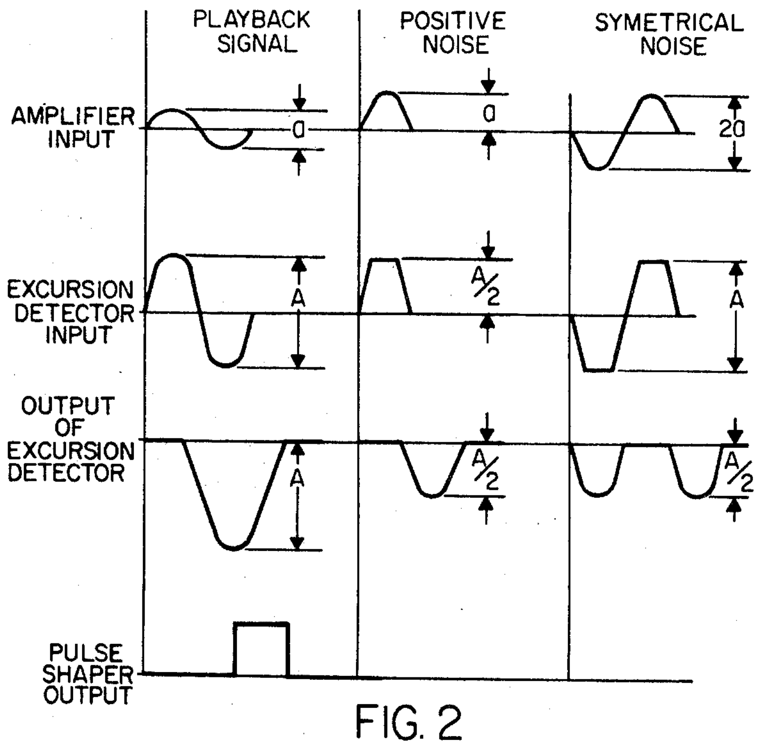
FIG. 2 is a waveform diagram showing signals at various points in the system.
Figure 1:
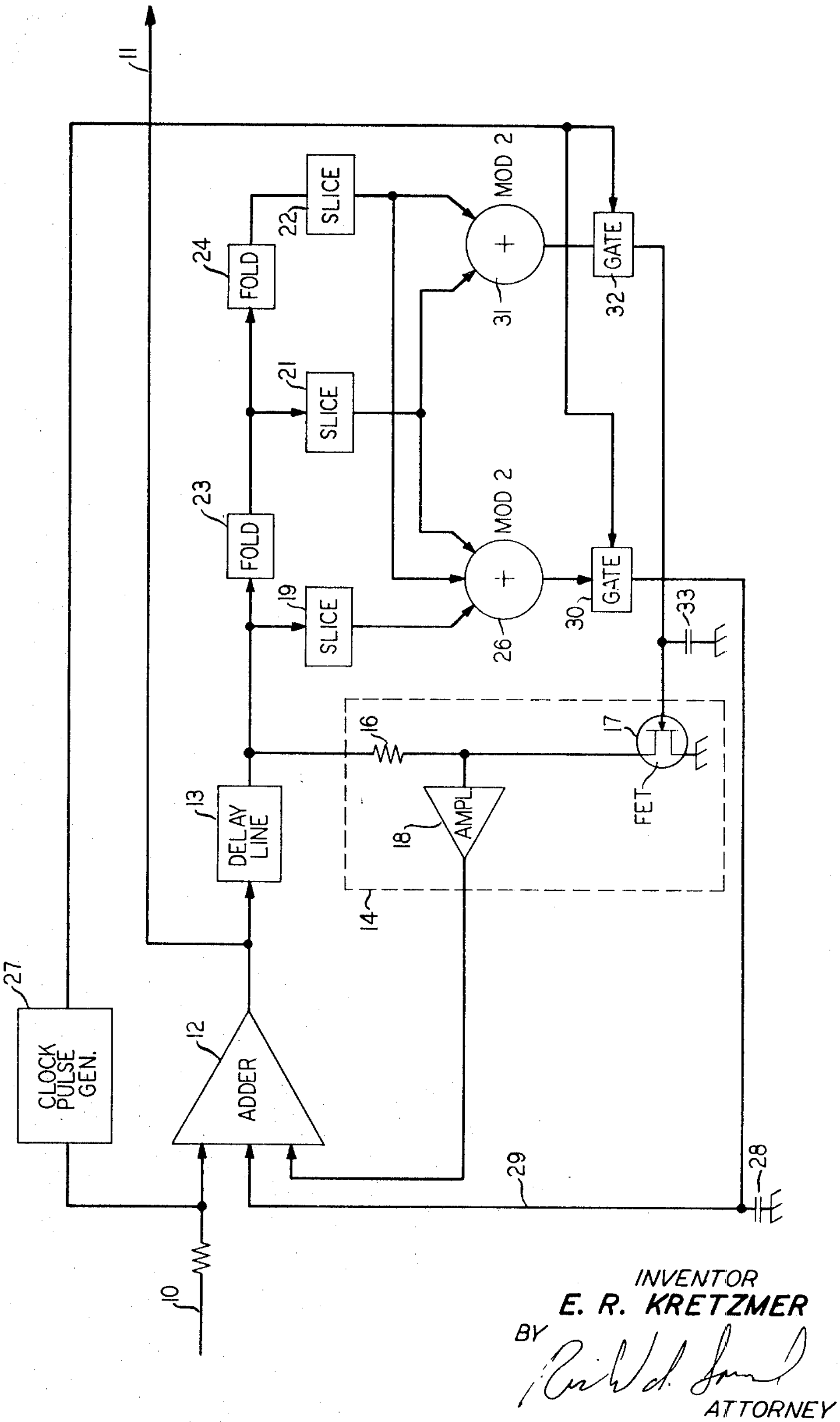
Figure 2:
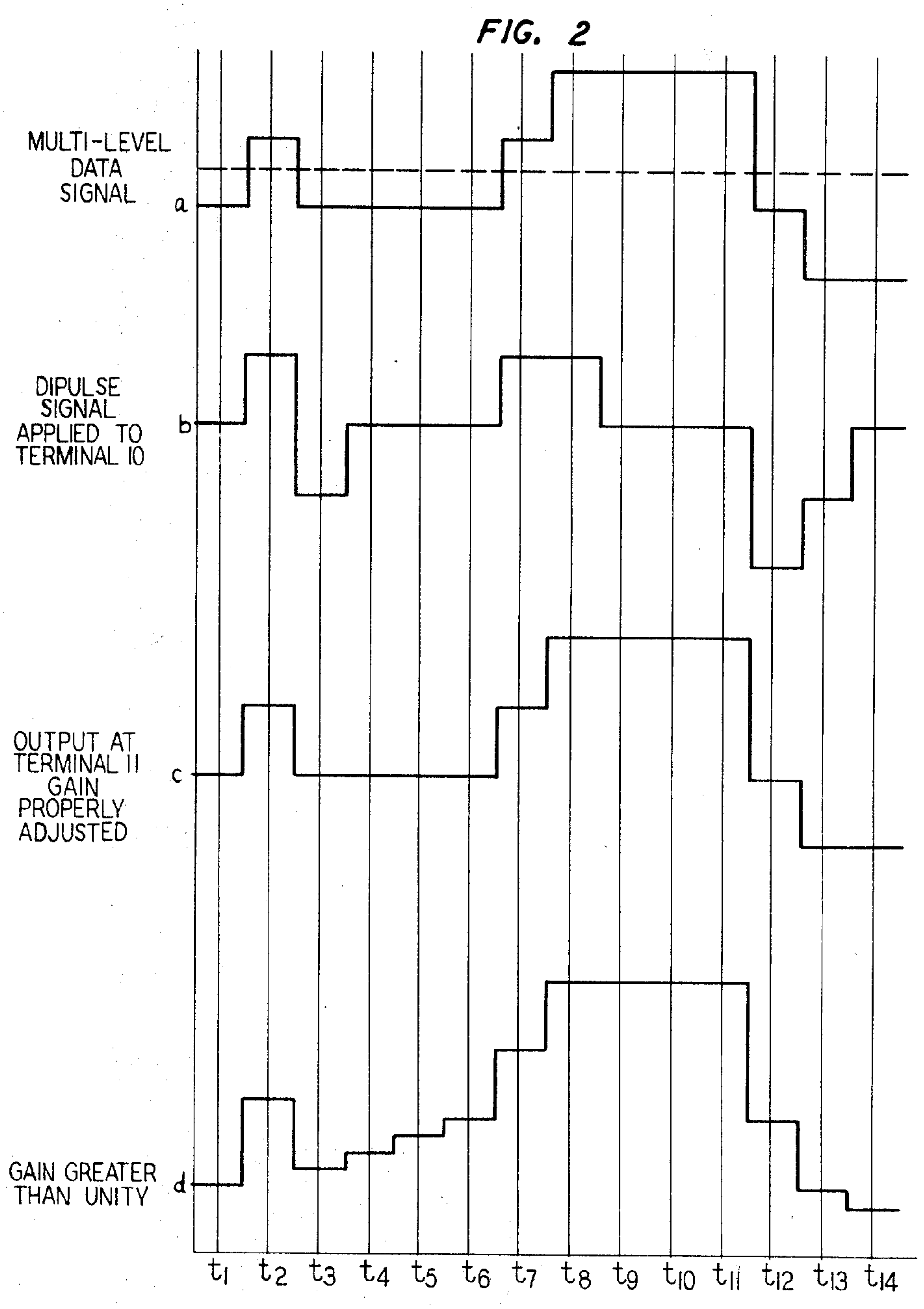

The system shown in FIG. 1 is an adaptively adjustable previous value adder circuit which constitutes a received dipulse signal, as shown in FIG. 2, line *b*, applied at an input terminal 10 to provide a multilevel data signal at an output terminal 11. The dipulse signal is generated at a transmitting terminal, not shown, by delaying a multilevel data signal, as shown in FIG. 2, line *a*, one data interval and subtracting the delayed signal from the original multilevel data signal.

FIG. 2 shows that the positive pulse occurring at time $t_2$ in the multilevel data signal on line *a* appears as a positive pulse at time $t_2$ and a negative pulse at time $t_3$ in the dipulse signal on line *b*. When there has been no change in the level of the multilevel data signal since the last data interval, the dipulse signal is zero. For example, examine lines *a* and *b* of FIG. 2 at times $t_3$ and $t_4$, $t_8$ and $t_9$, and $t_{13}$ and $t_{14}$. Each time there is a change in level of the multilevel data signal, the dipulse signal varies in response. For example, examine lines *a* and *b* of FIG. 2 at times $t_6$ and $t_7$, and $t_{11}$ and $t_{12}$. The dipulse signal is therefore a differential signal.

The dipulse signal received on terminal 10 is passed through adder circuit 12 to delay line 13. Delay line 13 delays the signal applied thereto one data interval of the received signal. The delayed signal is fed back by feedback network 14 and applied as a second input to adder 12. Feedback network 14 comprises a voltage controlled attenuator including fixed resistor 16, the variable impedance between the source and drain of field effect transistor 17, and fixed gain amplifier 18. The gain of the amplifier and the range of attenuation of the attenuator is such that the gain from the first input of adder 12 through delay line 13 and the feedback network 14 to the second input of the adder 12 may be set exactly to unity.

If the feedback network 14 is adjusted so that this gain is exactly unity, the signal appearing at the output of adder 12 is an integration of the received signals, as shown in FIG. 2, line *c*.

If, on the other hand, the gain is greater than unity, a signal such as the one shown in line *d* of FIG. 2 is provided by adder 12. The pulse appearing at time $t_2$ in the dipulse signal, line *b*, appears at the output of adder 12, line *d*. This signal is passed and amplified by the combination of delay line 13 and feedback network 14. A feedback signal having an amplitude greater than that of the original signal at time $t_2$ is therefore applied as an input to adder 12 at time $t_3$. The negative pulse appearing in the dipulse signal at time $t_3$ is equal in amplitude to the positive pulse appearing in the dipulse signal at time $t_2$. Therefore, the positive feedback signal provided at time $t_3$ is slightly larger than the negative dipulse signal. A small positive signal results at the output of adder 12 at time $t_3$. It should be noted in lines *a* and *c* of FIG. 2 that with the gain properly adjusted the original multilevel data signal and the reconstituted signal had zero values at time $t_3$. This positive signal is recirculated around the loop, thereby being amplified slightly each time when providing a staircase waveform, as seen on line *d* of FIG. 2. A DC offset introduced in this feedback loop is similarly integrated thereby providing a stepwise cumulative error.

In many multilevel data systems, *n* slicing circuits, coupled by *n*—1 folding or rectifying circuits, are employed to convert a data signal having $2^n$ levels into *n* binary data signals in parallel. It is known that one additional folding circuit followed by an additional slicing circuit can be employed to provide an additional binary signal bearing information which, when combined with the parallel data signals in modulo-2 adding circuits, provides signals indicative of DC error polarity and amplitude deviation of the multilevel data signal from a predetermined standard.

The output of delay line 13 is therefore fed into a series of slice and fold circuits. Slicing circuits 19 and 21 decode the multilevel data signal while slicing circuit 22 provides other information. Fold circuits 23 and 24 respectively rectify the signals sliced by the previous slicing circuits 19 and 21 and thereby provides appropriate level shifting. The output signals of slicing circuits 19, 21, and 22 are combined in modulo-2 adding circuit 26 to provide a DC error signal. Clock pulse generator 27, which is synchronized by transitions in the received multilevel data signal, periodically enables gate 30 effectively to sample the DC error signal. These samples, whose instantaneous polarities correspond to that of the error signal, are integrated by capacitor 28, thereby providing a long term average of the DC error signal. Lead 29 applies the long term average DC error signal to adder 12, thereby compensating for DC offsets in the received multilevel data signal and in the previous value adder circuit.

In a like manner, the outputs of slicing circuits 21 and 22 are combined in modulo-2 adder circuit 31 to provide an amplitude deviation signal. The amplitude deviation signal is periodically sampled by pulses from clock pulse generator 27 incident on gate 32. These samples are integrated by capacitor 33. The voltage thereby developed across capacitor 33 drives the gate of field effect transistor 17 and controls its source-to-drain impedance. It will be remembered that the source-to-drain impedance of field effect transistor 17 controls the gain of feedback network 14. In this way, the feedback signal applied to adder 12 is controlled so that error integration, such as that shown on line *d* of FIG. 2, is eliminated.

It is to be understood that the above-described arrangement is illustrative of the application of the principles of this invention. Numerous other arrangements may be devised by those skilled in the art without departing from the spirit and scope of the invention.

I claim:

1. In combination:

means for combining a received quantized differential signal with a compensating signal to provide an output signal, means for delaying said output signal to provide a delayed signal, means responsive to the long time average of the deviation of the amplitude of said delayed signal from predetermined values for providing a control signal, a voltage divider including a field effect transistor connected between the output of said delaying means and a reference potential jointly responsive to said delayed signal and said control signal for providing said compensating signal, and an amplifier for providing said compensating signal to said combining means.

2. In combination:

means for combining a received quantized differential signal with a compensating signal to provide an output signal, means for delaying said output signal to provide a delayed signal, means for rectifying said delayed signal to provide a first rectified signal, first slicing means for providing at a first terminal a first signal when said first rectified signal exceeds a first predetermined value and a second signal when said first rectified signal is less than said first predetermined value, means for rectifying said first rectified signal to provide a second rectified signal, second slicing means for providing at a second terminal said first signal when said second rectified signal exceeds a second predetermined value and said second signal when said second rectified signal is less than said second predetermined value, means responsive to the logical combination of the signals at said fist and second terminals for providing a control signal, and means responsive to said control signal for varying the amplitude of said delayed signal to provide said compensating signal.

3. In combination:

means for combining a received quantized differential signal with first and second compensating signals to provide an output signal, means for delaying said output signal to provide a delayed signal, means responsive to the long time average of the deviation of the amplitude of said delayed signal from predetermined values for providing a control signal, means responsive to said control signal for varying the amplitude of said delayed signal to provide said first compensating signal, first slicing means for providing at a first terminal a first signal when said delayed signal exceeds a first predetermined value and a second signal when said delayed signal is less than said first predetermined value, means for rectifying said delayed signal to provide a rectified signal, second slicing means for providing at a second terminal said first signal when said rectified signal exceeds a second predetermined value and said second signal when said rectified signal is less than said second predetermined value, and means responsive to the signals at said first and second terminals for providing said second compensating signal.

4. In combination:

means for combining a received quantized differential signal with a compensating signal to provide an output signal, means for delaying said output signal to provide a delayed signal, first slicing means for providing at a first terminal a first signal when said delayed signal exceeds a first predetermined value and a second signal when said delayed signal is less than said first predetermined value, means for rectifying said delayed signal to provide a rectified signal, second slicing means for providing at a second terminal said first signal when said rectified signal exceeds a second predetermined value and said second signal when said rectified signal is less than said second predetermined value, and means responsive to the signals at said first and second terminals for providing said compensating signal.